United States Patent [19]

Zander

[11] Patent Number: 5,502,529
[45] Date of Patent: Mar. 26, 1996

[54] METHOD OF RECYCLING SINGLE-USE CAMERA

[75] Inventor: Dennis R. Zander, Penfield, N.Y.

[73] Assignee: Eastman Kodak Company, Rochester, N.Y.

[21] Appl. No.: 388,645

[22] Filed: Feb. 14, 1995

[51] Int. Cl.⁶ .......................... G03B 15/05; G03B 17/18; G03B 29/00
[52] U.S. Cl. ................... 354/127.1; 354/76; 354/149.11; 354/202; 354/468
[58] Field of Search ............................ 354/75, 76, 127.1, 354/127.12, 149.11, 202, 289.1, 465, 468; 73/5

[56] References Cited

U.S. PATENT DOCUMENTS

| | | | |
|---|---|---|---|
| 5,021,811 | 6/1991 | Maurinus et al. | 354/76 |
| 5,235,366 | 8/1993 | Kucmerowski | 354/212 |
| 5,418,585 | 5/1995 | Petruchik et al. | 354/76 |
| 5,436,685 | 7/1995 | Yamashina | 354/202 |

*Primary Examiner*—A. A. Mathews
*Attorney, Agent, or Firm*—Roger A. Fields

[57] ABSTRACT

A method of recycling a single-use camera after a function of the camera has been purposefully disabled to prevent unauthorized reuse of the camera, comprising inputting a reset code to the camera to re-enable the function that has been disabled to permit authorized reuse of the camera, is characterized further by inputting a start code to the camera before the reset code is to be inputted to the camera to condition the camera for testing, testing the camera to determine whether the camera is reusable, and preventing the reset code from being inputted to the camera when testing the camera indicates the camera is not reusable.

13 Claims, 6 Drawing Sheets

METHOD OF RECYCLING SINGLE-USE CAMERA

CROSS-REFERENCED TO RELATED APPLICATIONS

Reference is made to commonly assigned applications Ser. No. 08/210,983, entitled METHOD AND APPARATUS FOR PREVENTING UNAUTHORIZED RECYCLING OF SINGLE-USE CAMERA AND PERMITTING AUTHORIZED REUSE OF THE CAMERA, and filed Mar. 21, 1994 in the names Dwight J. Petruchick and Clay A. Dunsmore, now U.S. Pat. No. 5,418,585 and Ser. No. 08/369,960, entitled METHOD AND APPARATUS FOR PREVENTING UNAUTHORIZED RECYCLING OF SINGLE-USE CAMERA AND PERMITTING AUTHORIZED REUSE OF THE CAMERA, and filed Jan. 9, 1995 in the name Dennis R. Zander.

The cross-referenced applications are incorporated in this application.

FIELD OF THE INVENTION

The invention relates generally to the field of photography, and in particular to single-use cameras. More specifically, the invention relates to a method and apparatus for preventing unauthorized recycling of a single-use camera after a roll of film in the camera is completely exposed and for permitting authorized reuse of the camera when the roll of film is replaced with another one.

BACKGROUND OF THE INVENTION

Film and cameras that are all in one, commonly referred to as single-use cameras, have recently become well known. Typically, the single-use camera is a simple point-and-shoot type comprising a plastic main body portion which supports a fixed-focus taking lens, a film metering mechanism, a manual film advance thumbwheel, a single-blade shutter, a manual shutter release button, a frame counter for indicating the number of exposures remaining for picture-taking, a direct see-through viewfinder tunnel, and possibly an electronic flash unit. Front and rear plastic casing or cover portions house the main body portion between them to form a light-tight camera unit. A decorative cardboard outer box contains the camera unit and has respective openings for the taking lens, the shutter release button, the film advance thumbwheel, the viewfinder tunnel, the frame counter, and a flash emission window.

At the manufacturer, the main body portion is loaded with a conventional 12, 24, or 36 exposure 35 mm film cartridge and the front and rear casing portions are connected to each other and/or to the main body portion to assemble the light-tight camera unit. Then, an exposed end of a supply spool in the main body portion is rotated to factory prewind substantially the entire length of the unexposed filmstrip from the cartridge onto the supply spool. Lastly, the outer box is placed on the camera unit.

After the photographer takes a picture using the single-use camera, he or she manually rotates the thumbwheel in engagement with a take-up spool inside the cartridge to rewind the exposed frame into the cartridge. The rewinding movement of the filmstrip the equivalent of slightly more than one frame width rotates a metering sprocket in engagement with the filmstrip to decrement the frame counter to its next lower-numbered setting. When the maximum number of exposures available on the filmstrip are exposed and the filmstrip is completely rewound into the cartridge, the single-use camera is given to a photofinisher who tears the outer box off the camera unit, separates the rear cover portion from the main body portion, and removes the cartridge with the filmstrip from the main body portion. Then, he removes the filmstrip from the cartridge to develop the negatives and make prints for the customer, and he forwards the used camera parts to the manufacturer for recycling, i.e. remanufacture.

During recycling, the main body portion is re-loaded with a film cassette containing fresh film, and the front and rear casing portions are re-connected to each other and/or to the main body portion. Then, the exposed end of the supply spool in the main body portion is again rotated to factory prewind substantially the entire length of the unexposed filmstrip from the cartridge onto the supply spool. Lastly, a new outer box is placed on the camera unit.

There is a need recognized in the industry to prevent unauthorized recycling of single-use cameras in order to maintain camera quality. Unauthorized recycled cameras may be of lesser quality than authorized recycled cameras.

THE CROSS-REFERENCED APPLICATIONS

The cross-referenced application Ser. No. 08/210,983, now U.S. Pat. No. 5,418,585, discloses a method of preventing unauthorized recycling of a single-use camera but permitting authorized reuse of the camera. According to the method, it is first determined that the maximum number of exposures on a roll of film in the camera is exposed. Then, a function of the camera such as operation of an electronic flash unit in the camera is disabled to prevent unauthorized reuse of the camera with a roll of fresh film. To permit authorized reuse of the camera with the roll of fresh film, a reset code must be inputted to the camera. The reset code re-enables the function that has been disabled The cross-referenced application Ser. No. 08/369,960 calls for a start code to be inputted to the camera via an ambient light sensor for the electronic flash unit to make the camera then accept the reset code via the same sensor.

SUMMARY OF THE INVENTION

A method of recycling a single-use camera after a function of the camera has been purposefully disabled to prevent unauthorized reuse of the camera, comprising inputting a reset code to the camera to re-enable the function that has been disabled to permit authorized reuse of the camera, is characterized further by:

inputting a start code to the camera before the reset code is to be inputted to the camera to condition the camera for testing;

testing the camera to determine whether the camera is reusable; and preventing the reset code from being inputted to the camera when testing the camera indicates the camera is not reusable.

DETAILED DESCRIPTION OF THE INVENTION

The invention is disclosed as being embodied preferably in a single-use 35 mm camera having a built-in electronic flash unit. Because the features of such a camera are generally known, the description which follows is directed in particular only to those elements forming part of or cooperating directly with the disclosed embodiment. It is to be understood, however, that other elements may take various forms known to a person of ordinary skill in the art.

Figure 1:
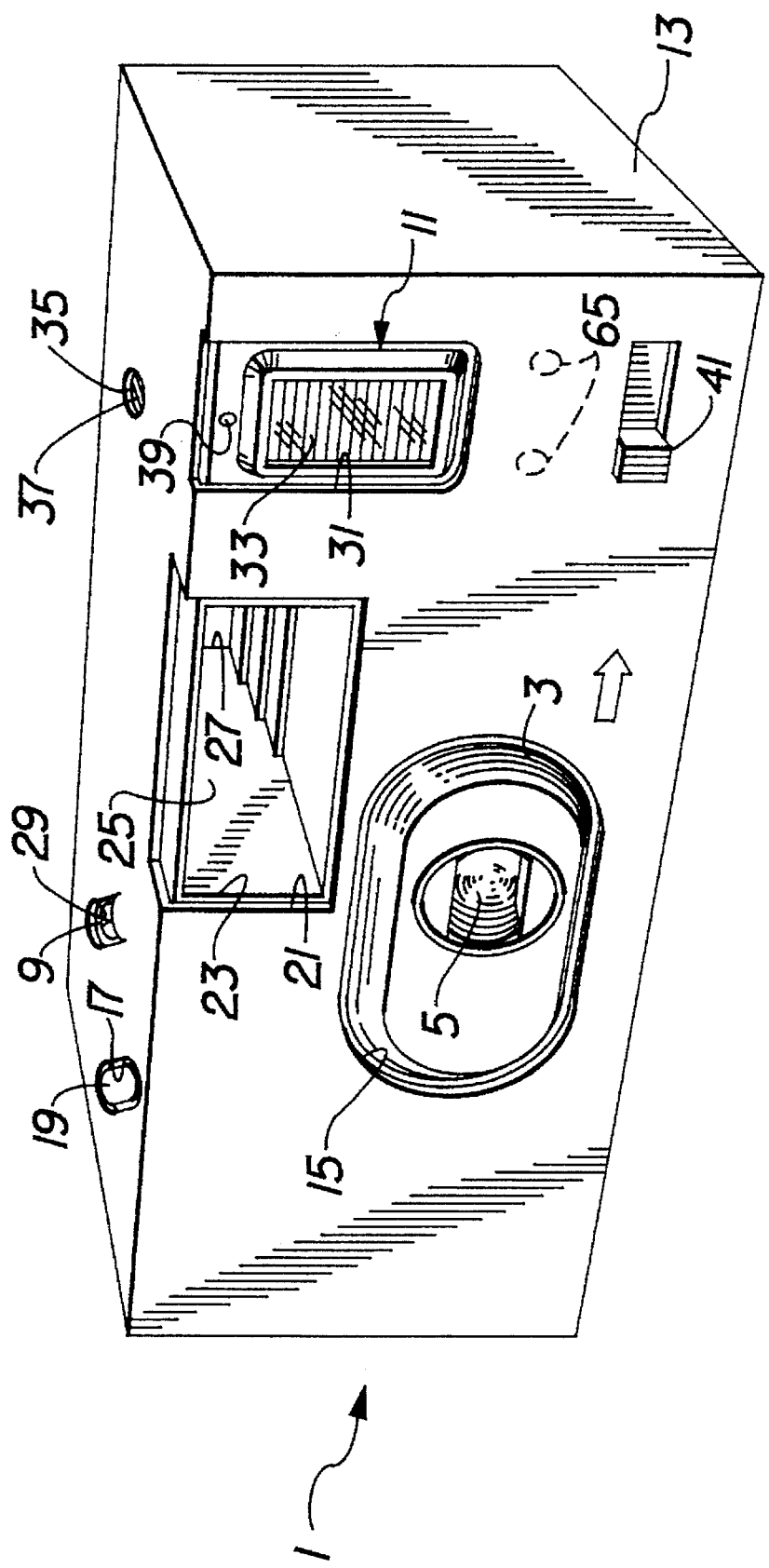
FIG. 1 is a front perspective view of a single-use camera with a built-in electronic flash unit.
Figure 2:
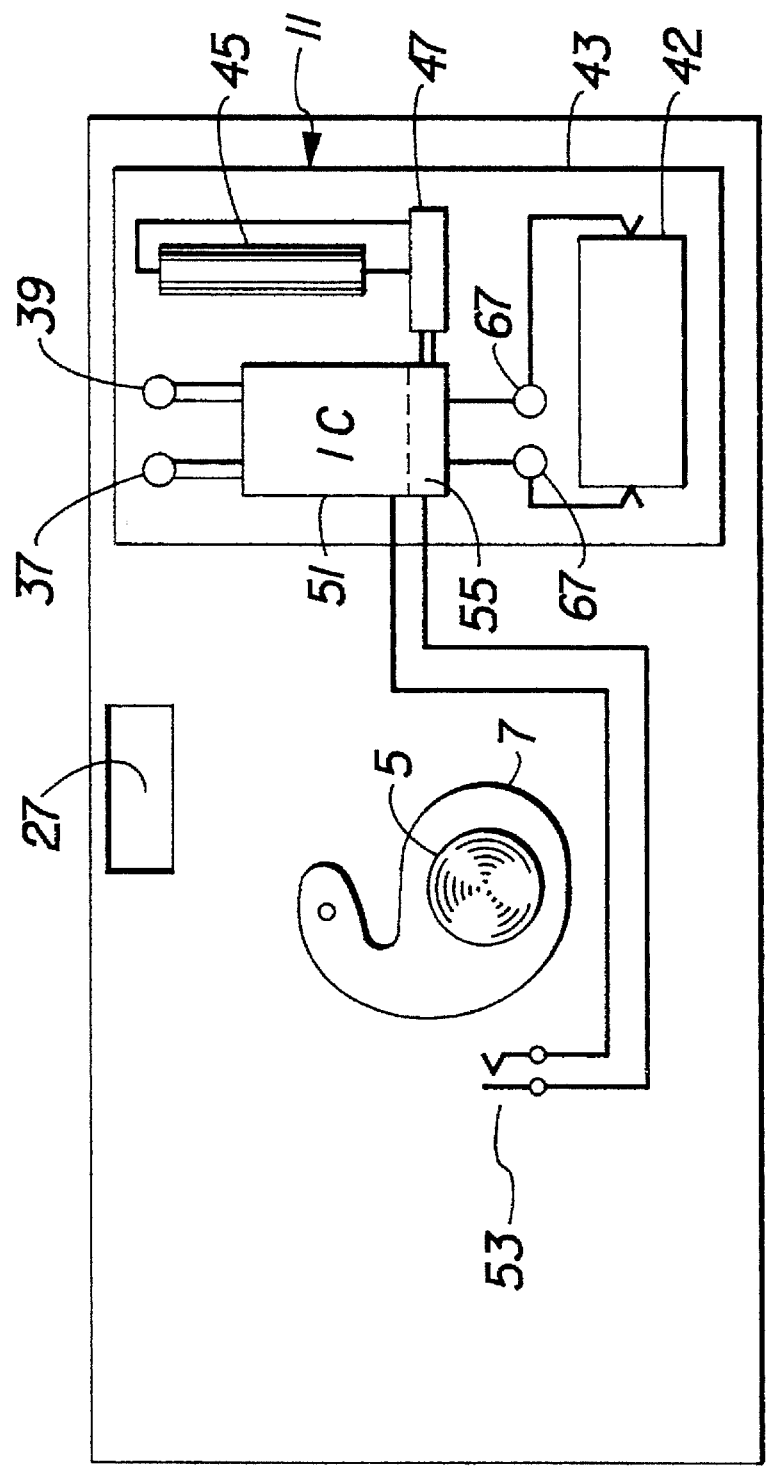
FIG. 2 is a front elevation view of the single-use camera as seen from the inside to show various camera components that comprise a preferred embodiment of the invention.

Referring now to the drawings, FIGS. 1 and 2 show a single-use camera 1 which comprises a plastic light-tight camera unit 3 housing a known fixed-focus taking lens 5, a known film metering mechanism, not show, a known single-blade shutter 7, a known frame counter 9 for visibly indicating the number of exposures remaining for picture-taking, and an electronic flash unit 11. A cardboard outer cover or casing 13 contains the camera unit 3 and has a front opening 15 for the taking lens 5, a top opening 17 for a manual shutter release button 19, a rear opening for a manual film advance thumbwheel, not shown, a front opening 21 for a front viewfinder window 23 of a direct see-through viewfinder 25, a rear opening, not shown, for a rear viewfinder window 27, a top opening 29 for the frame counter, a front opening 31 for a flash emission window 33, and a top opening 35 for a flash-ready light emitting diode (LED) 37. A known ambient light sensor 39 for operation of the electronic flash unit 11 is located in the front opening 31 above the flash emission window 33. The ambient light sensor 39 provides a brightness measure of the ambient light to determine whether a flash or daylight exposure is in order. A commonplace on-off switching slide 41 located between a battery 42 and the electronic flash unit 11 is manually moved to the right in FIG. 1 to an "on" position to electrically connect the battery and the flash unit.

The flash unit 11 as shown in FIG. 2 includes a flash circuit board 43 on which is mounted the battery 42, a known flash tube 45 located behind the flash emission window 33, a known flash charger circuit 47 for storing a suitable voltage to ignite the flash tube to provide flash illumination, and an integrated control circuit (IC) 51. The IC 51 is connected to the LED 37, the ambient light sensor 39, the battery 42, the flash charger circuit 47, and a normally open shutter-flash synch switch 53. The shutter-flash synch switch 53 is closed every time the shutter blade 7 is pivoted open, clockwise in FIG. 2, to momentarily uncover the taking lens 5 to take a picture. As is well known, the shutter blade 7 is spring-biased to close and is to be pivoted open by a known shutter actuating device, not shown, in response to manually depressing the shutter release button 19.

At the manufacturer, the camera unit 3 is loaded with a conventional 12, 24, or 36 exposure 35 mm film cartridge and substantially the entire length of the unexposed filmstrip is factory prewound from the cartridge onto a spool, not shown, in the camera unit. Also, the frame counter 9 is set to the maximum number of exposures available on the unexposed filmstrip. After the photographer takes a picture, he or she manually rotates the film advance thumbwheel to rewind the exposed frame into the cartridge. The rewinding movement of the filmstrip the equivalent of slightly more than one frame width rotates a metering sprocket, not shown, to decrement the frame counter 9 to its next lower numbered setting, e.g. from "36" to "35". Further details of this operation are disclosed in commonly assigned U.S. Pat. No. 5,235,366, issued Aug. 10, 1993. When the maximum number of exposures available on the filmstrip are exposed and the filmstrip is completely rewound into the cartridge, the single-use camera 1 is given to a photofinisher who first removes the filmstrip from the camera unit 3 to develop the negatives and then forwards the camera unit to the manufacturer for recycling. The manufacturer, in turn, recycles the camera unit 3 by loading it with a fresh roll of film and repeating the foregoing prewinding process.

Figure 3:
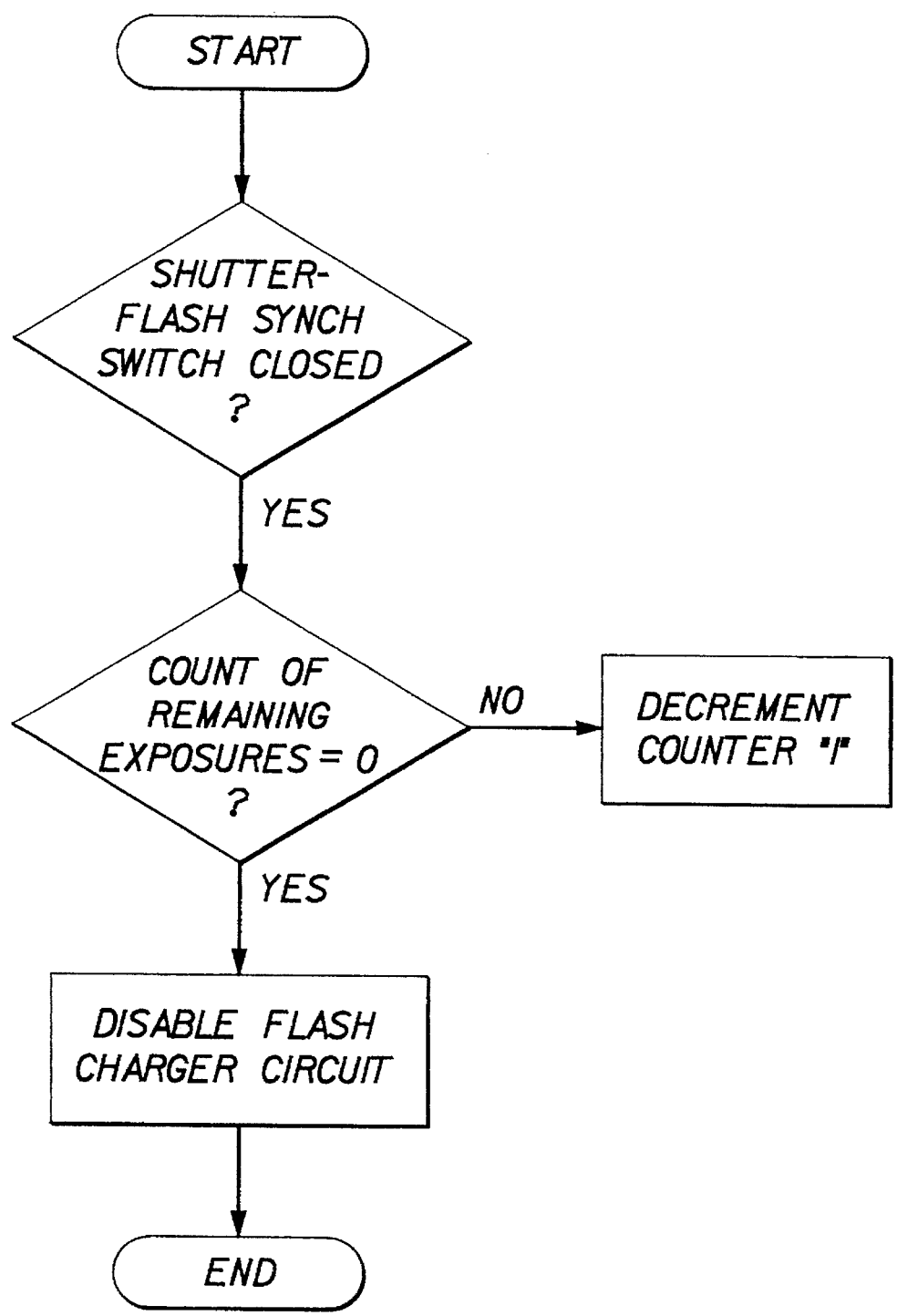
FIG. 3 is a a flow chart.

The IC 51 includes a known count-down counter 55 which when initialized is set to the maximum number of exposures available on a roll of film in the camera unit 3 (similar to the frame counter 9). The counter 55 is adapted to be decremented by "1" when the shutter-flash synch switch 53 is closed by the shutter blade 7 to take a picture, to provide a count of the number of exposures remaining to be made on the roll of film. As shown in FIG. 3, each time the shutter-flash synch switch 53 is closed due to manually depressing the shutter release button 19, the IC 51 interrogates the counter 55 to determine whether its count is at least "1". If the count is at least "1" the counter 55 is decremented by "1". Conversely, if the counter is "0" the flash charger circuit 47 is disabled. This prevents unauthorized recycling and reuse of the single-use camera 1.

Figure 5:
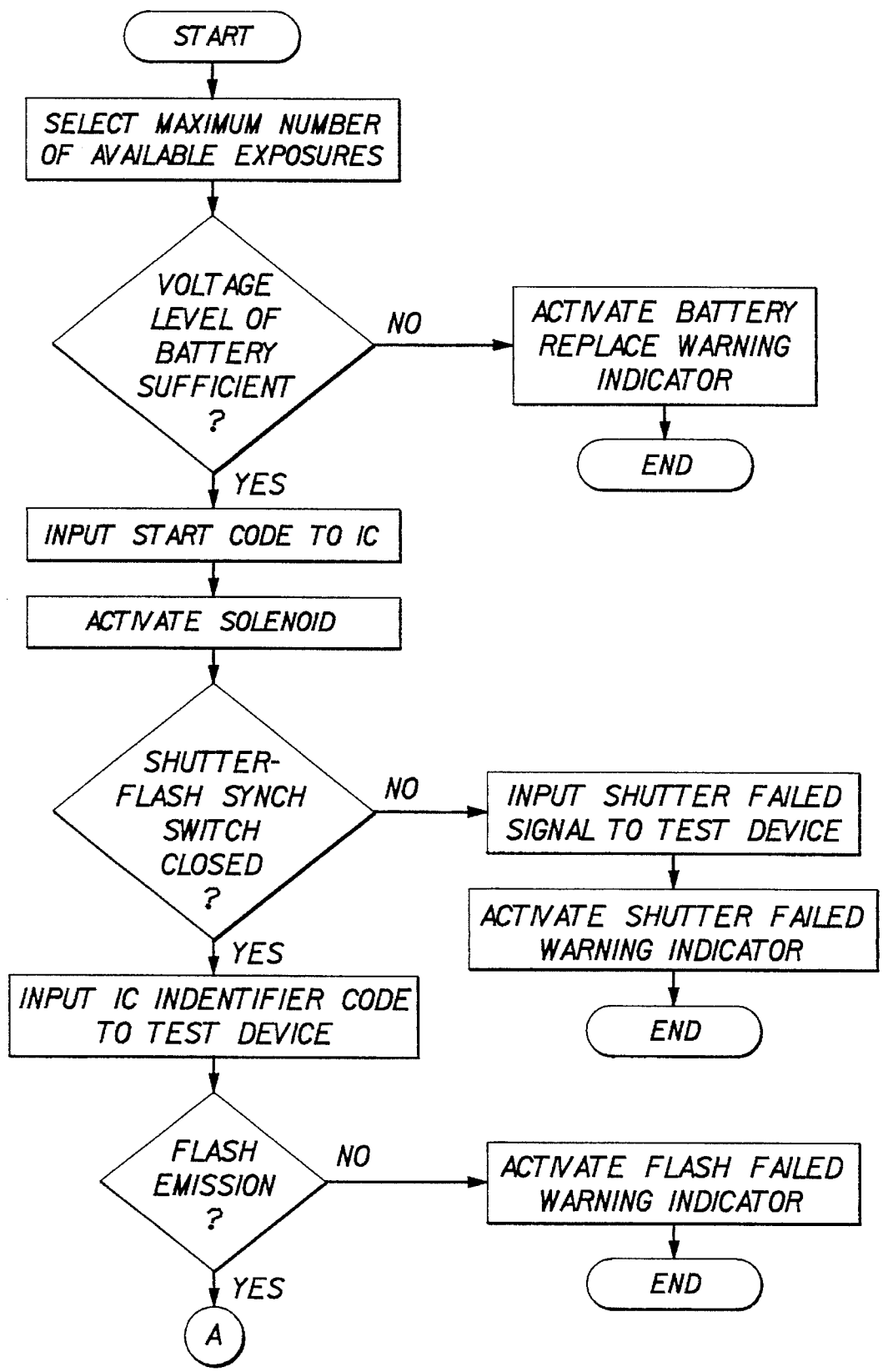
FIGS. 5 and 6 together are a flow chart.
Figure 6:
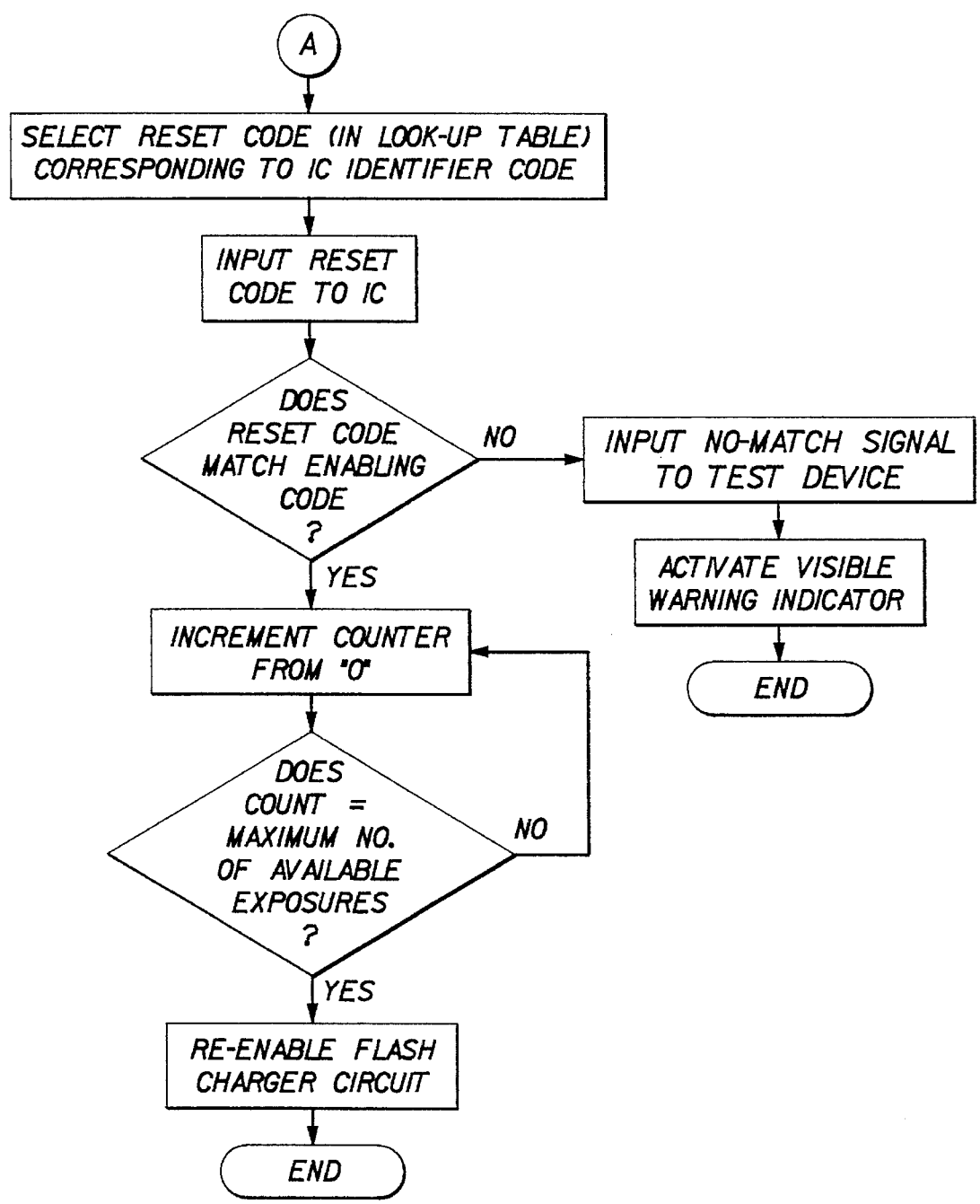

When the flash charger circuit 47 is disabled, the camera unit 3 cannot be wholly recycled unless the flash charger circuit 47 is re-enabled for reuse with a fresh film load. According to the invention, there is provided a method of permitting authorized recycling of the camera unit 3. This method is depicted in FIGS. 5 and 6 and comprises the following steps:

(0) A precondition to step (1) is that the on-off switching slide 41 be in the "on" position and the shutter actuating device, not shown, be initialized to pivot the shutter blade 7 open in response to depression of the shutter release button 19.

Figure 4:
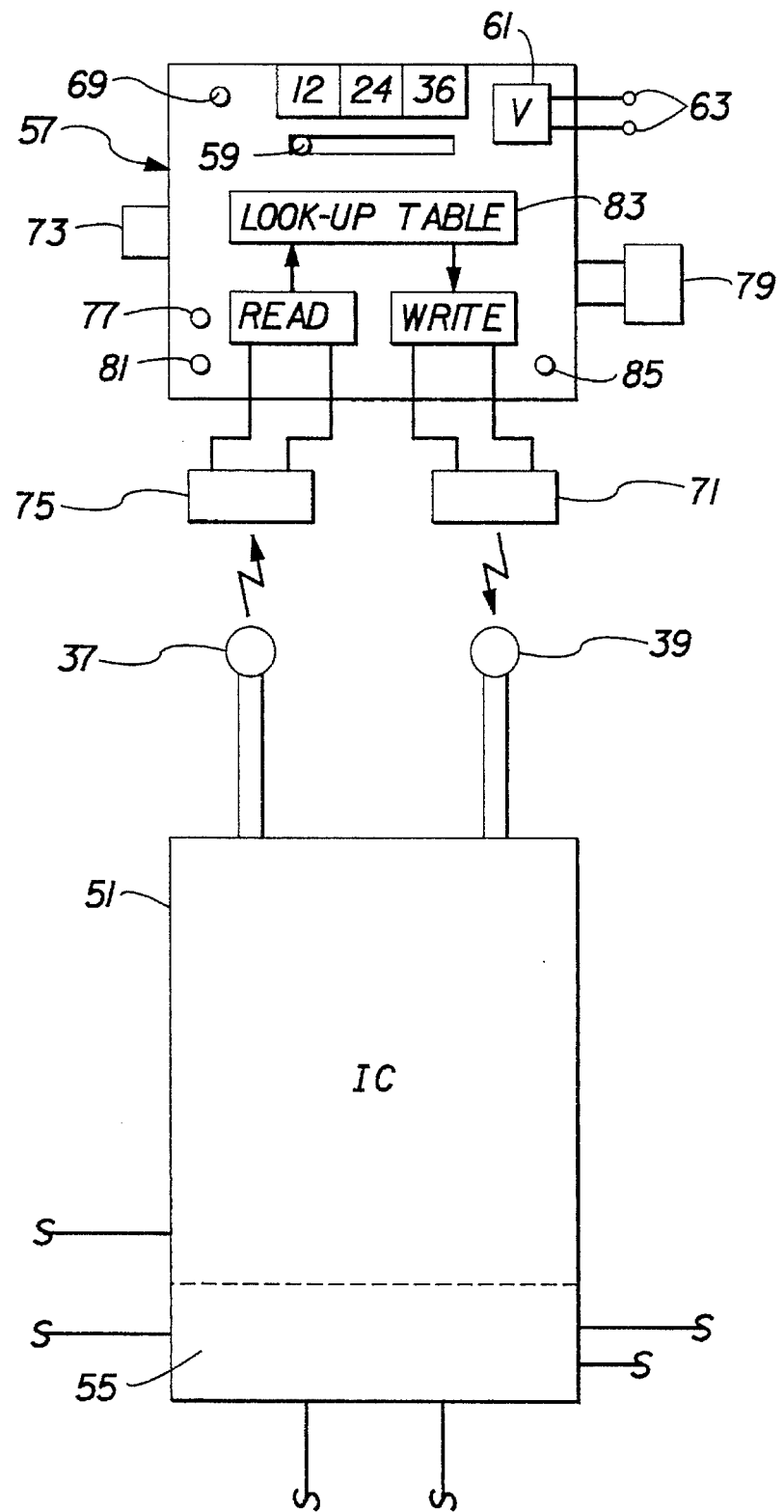
FIG. 4 is a schematic view of a test device and certain camera components of the preferred embodiment.

(1) The maximum number of exposures available on a fresh roll of film loaded or to be loaded in the camera unit 3 is selected on a test device 57 by manually sliding a pointer 59 to the selected number "12", "24", or "36". The test device 57 is shown in FIG. 4.

(2) A known voltage level sensor 61 of the test device 57 has a pair of external probes 63 intended to be inserted through respective front access holes 65 in the camera unit 3 to make electrical contact with two conductive pads 67 connected to the respective opposite poles of the battery 42. If the voltage level of the battery 42 as determined by the sensor 61 is insufficient for authorized reuse of the camera unit 3, a visible battery replace warning indicator 69 of the test device 57 is activated.

(3) If the voltage level of the battery 42 as determined by the sensor 61 is sufficient for authorized reuse of the camera unit 3, a code-source light emitting diode (LED) 71 of the test device 57 positioned directly opposite the ambient light sensor 39 inputs a start or trigger code to the IC 51 via the ambient light sensor. The start code is a plurality of light pulses each having a different duration, and when inputted to the IC 51 it causes the IC to be conditioned for testing the single-use camera 1. One aspect of this conditioning involves the IC 51 re-enabling the flash charger circuit 47 for a one-time use, regardless of whether a daylight or flash exposure is in order, when the shutter-flash synch switch 53 is closed. Other aspects of the conditioning are described in several of the method steps which follow step (3).

(4) Once the start code is inputted to the IC 51, a solenoid 73 of the test device 57 positioned directly opposite the shutter release button 19 is activated to depress the shutter release button to permit the shutter blade 7 to pivot open to close the shutter-flash-synch switch 53. If the flash-synch switch 53 is not closed, the IC 51 issues a shutter failed signal to the LED 37. The LED 37, in turn, inputs the shutter failed signal to the test device 57 via a phototransistor 75 of the test device positioned directly opposite the LED. The shutter failed signal is a plurality of light pulses each having a different duration, and when inputted to the test device 57 causes a visible shutter failed warning indicator 77 of the test device to be activated.

(5) If the flash-synch switch 53 is closed, the IC 51 issues an identifier code to the LED 37. The LED 37, in turn, inputs the identifier code to the test device 57 via the phototransistor 75. The identifier code is a plurality of light pulses each having a different duration, and is unique to the IC 51 to make it more difficult to decipher that code.

(6) Since the start code inputted to the IC 51 in step (3) has conditioned the IC to re-enable the flash charger circuit 47 for a one-time use regardless of whether a daylight or flash exposure is in order, when the flash-synch switch 53 is closed the flash tube 45 should be ignited. A phototransistor 79 of the test device 57 is positioned directly opposite the flash emission window 33 to sense the flash ignition. If the flash ignition does not occur as determined by the phototransistor 79, a visible flash failed warning indicator 81 of the test device 57 is activated.

(7) The test device 57 includes a look-up table 83 having a plurality of identifier codes (for various IC's), one of which is the identifier code that has been inputted to the test device in step (5), and a plurality of reset codes that correspond 1:1 to the identifier codes, and is adapted via a known central processing unit (CPU), not shown, to select the reset code that corresponds to the identifier code that has been inputted to the test device in step (5). Also, the plurality of reset codes correspond 1:1 to various enablement codes (provided in respective IC's), one of which is provided in the IC 51 for instructing that IC to trigger initializing the counter 55 and re-enabling the flash charger circuit 47 for reuse with a fresh film load. If the flash ignition does occur as determined by the phototransistor 79, the CPU selects the reset code that corresponds to the identifier code that has been inputted to the test device 57 in step (5).

(8) The LED 71 then inputs the reset code, which has been selected in step (7), via the ambient light sensor 39 to the IC 51. The reset code is a plurality of light pulses each having a different duration.

(9) Presumably, the reset code that is inputted to the IC 51 will match the enablement code of that IC. As a result, the counter 55 will be incremented from "0" to the number of exposures selected in step (1) and the flash charger circuit 49 will be re-enabled for reuse with a fresh film load.

(10) If the reset code that is inputted to the IC 51 does not match the enablement code of that IC for some reason, the IC issues a no-match signal to the LED 37. The LED 37, in turn, inputs the no-match signal to the test device 57 via the phototransistor 75. The no-match signal is a plurality of light pulses each having a different duration, and when inputted to the test device 57 causes a visible no-match warning indicator 85 of the test device to be activated.

The term "code" or "codes" as used in regard to the start code, the identifier code, the reset code, and the enablement code is intended to be given the common ordinary meaning, i.e. a system of signals or symbols for communication used to represent assigned and often secret meanings, such as in the case of the Morse code and the binary and other machine languages used in digital computers. The various codes and signals, although preferably optical, can be a number of other different types, e.g. electrical or magnetic, digital or analog.

The invention has been described with reference to a preferred embodiment. However, it will be appreciated that variations and modifications can be effected by a person of ordinary skill in the art without departing from the scope of the invention. For example, instead of disabling the flash charger circuit 49 to prevent the flash function of the camera unit 3, anyone of several other known functions or operations of the camera unit such as shutter operation or film advance operation can be disabled. In this sense, the terms "functions" and "operations" are intended to be equivalents. Also, instead of counting the number of closures of the shutter-flash synch switch 53 for the purpose of disabling a function of the camera unit 3, various other events may be used to determine when to disable a function of the camera unit. For instance, a function of the camera unit 3 can be disabled in response to removing an exposed roll of film from the camera unit, in response to removing a battery from the camera unit, or in response to opening the camera unit to remove the exposed roll of film. Also, instead of the start code causing the IC 51 to re-enable the flash charger circuit 47 for a one-time use, it could re-enable the flash charger circuit for a several-times use significantly less than intended for picture-taking.

As suggested in commonly assigned U.S. Pat. No. 5,021,811, issued Jun. 4, 1991, the flash circuit board 43 can include means for visibly indicating the number of times the camera unit 3 has been recycled.

PARTS LIST FOR FIGS. 1–6

1. single-use camera
3. light-tight camera unit
5. taking lens
7. shutter blade
9. frame counter
11. flash unit
13. outer cover
15. front opening
17. top opening
19. shutter release button
21. front opening
23. front viewfinder window
25. see-through viewfinder
27. rear viewfinder window
29. top opening
31. front opening
33. flash emission window
35. top opening
37. flash-ready LED
39. ambient light sensor
41. on/off switching slide
42. battery
43. flash circuit board
45. flash tube
47. flash charger circuit
51. IC
53. shutter-flash synch switch 55. counter
57. test device
59. pointer
61. voltage level sensor
63. two probes
65. two access holes
67. two conductive pads
69. battery replace warning indicator
71. code-source LED
73. solenoid
75. phototransistor
77. shutter failed warning indicator
79. phototransistor
81. flash failed warning indicator
83. look-up table
85. no-match warning indicator

What is claimed is:

1. A method of recycling a single-use camera after a function of the camera has been purposefully disabled to prevent unauthorized reuse of the camera, comprising inputting a reset code to the camera to re-enable the function that has been disabled to permit authorized reuse of the camera, is characterized further by:

inputting a start code to the camera before the reset code is to be inputted to the camera to condition the camera for testing;

testing the camera to determine whether the camera is reusable; and preventing the reset code from being inputted to the camera when testing the camera indicates the camera is not reusable.

2. A method as recited in claim 1, wherein the camera is prevented from accepting the reset code when testing the camera indicates the camera is not reusable.

3. A method as recited in claim 1, wherein the start code conditions the camera for testing by re-enabling the function that has been disabled only for a one-time use.

4. A method as recited in claim 1, wherein testing the camera includes opening a shutter in the camera to determine the shutter can be used during authorized reuse of the camera.

5. A method as recited in claim 4, wherein a visible warning indication is provided when it is determined the shutter cannot be opened.

6. A method as recited in claim 4, wherein it is determined the shutter has opened by determining a shutter-flash synch switch in the camera has changed state.

7. A method as recited in claim 4, wherein testing the camera includes firing an electronic flash unit in the camera to determine whether the flash unit can be used during authorized reuse of the camera.

8. A method as recited in claim 1, wherein a battery in the camera is tested before the start code is inputted to the camera to determine whether the battery has sufficient voltage for authorized reuse of the camera, and the start code is not inputted to the camera when the battery does not have sufficient voltage for authorized reuse of the camera.

9. A method as recited in claim 8, wherein a visible warning indication is provided when the start code is not inputted to the camera because the battery does not have sufficient voltage for authorized reuse of the camera.

10. A method as recited in claim 1, wherein the function that has been disabled is flash ignition, and the start code conditions the camera for testing by re-enabling flash ignition only for a one-time ignition.

11. A method as recited in claim 10, wherein flash ignition is re-enabled for a one-time ignition regardless of the level of ambient light during testing.

12. A method as recited in claim 10, wherein flash ignition is re-enabled for a one-time ignition regardless of the level of ambient light during testing when a flash-shutter synch switch in the camera changes state.

13. A method of preventing unauthorized recycling of a single-use camera but permitting authorized reuse of the camera, comprising the steps of first determining completed use of the camera has occurred and then disabling a function of the camera to prevent unauthorized reuse of the camera, and inputting a reset code to the camera to re-enable the function that has been disabled to permit authorized reuse of the camera, is characterized further by:

inputting a start code to the camera before the reset code is to be inputted to the camera to condition the function that has been disabled for testing;

testing the function that has been disabled to determine whether the camera can be reused or should be discarded; and preventing the reset code from being inputted to the camera to re-enable the function that has been disabled when testing the function indicates the camera should be discarded.

\* \* \* \* \*